United States Patent
Choi

(10) Patent No.: US 7,936,402 B2
(45) Date of Patent: May 3, 2011

(54) METHOD FOR SETTING DIGITAL BROADCASTING CHANNEL

(75) Inventor: Jae Bok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1338 days.

(21) Appl. No.: 11/478,670

(22) Filed: Jul. 3, 2006

(65) Prior Publication Data

US 2007/0002177 A1    Jan. 4, 2007

(30) Foreign Application Priority Data

Jul. 2, 2005    (KR) .................. 10-2005-0059450

(51) Int. Cl.
*H04N 5/50* (2006.01)
*H04N 5/46* (2006.01)
(52) U.S. Cl. ...................... 348/731; 348/554
(58) Field of Classification Search .......... 348/725, 348/726, 731–733, 728, 558, 554; 725/38, 725/39; *H04N 5/44, 5/50, 5/46, 5/455*
See application file for complete search history.

(56) References Cited

U.S. PATENT DOCUMENTS

| 2005/0188410 A1* | 8/2005 | Kahn et al. ............ 348/731 |
| 2006/0140301 A1* | 6/2006 | Choi et al. ............ 348/731 |

* cited by examiner

*Primary Examiner* — Sherrie Hsia
(74) *Attorney, Agent, or Firm* — Birch, Stewart, Kolasch & Birch, LLP

(57) ABSTRACT

Provided is a method for setting a digital broadcasting channel in a digital broadcasting receiver having a tuner and a demodulator. According to the method, when an automatic channel setting command is input by a user, a channel is selected using a tuner, and whether an NS flag is detected in each channel is judged. When the NS flag is not detected as a result of the judgment, a mode of each selected channel of the digital broadcasting receiver where signals are detected is judged from a VSB mode and a QAM mode. A channel map is constructed according to the judgment result. Accordingly, the method allows a subscriber or a manufacturer to automatically detect signals and store a corresponding channel in a channel map without separately setting cable broadcasting in cable digital TV broadcasting environment where VSB and QAM modes are provided.

6 Claims, 4 Drawing Sheets

METHOD FOR SETTING DIGITAL BROADCASTING CHANNEL

BACKGROUND OF THE INVENTION

1. Field of the Invention

The present invention relates to a method for setting a digital broadcasting channel.

2. Description of the Related Art

Digital TV broadcasting gradually expanding includes satellite digital TV broadcasting, ground wave digital TV broadcasting, and cable digital TV broadcasting. A variety of broadcasting methods have been proposed for digital TV broadcasting. For example, an advanced television system committee method (ATSC) is used for ground wave digital TV broadcasting transmission method. In this method, video signals are compressed using MPEG2, audio signals are compressed using AC-3, and vestigial side band (VSB) modulation is used for a transmission technology for conveying these signals. An open cable method is introduced for a cable digital TV broadcasting, and quadrature amplitude modulation (QAM) is used for a transmission method of a cable digital TV broadcasting.

The open cable method has been introduced to prevent monopoly of supply by a set-top box (STB) manufacturing company and to provide two-way digital cable broadcasting service without limitation of a service provider and a service region. The open cable method has three important factors of digital video subcommittee (DVS), cableCARD, and open cable application platform (OCAP). A future broadcasting/communication integrated service through a cable broadcasting network will be a service where a variety of services such as a two-way broadcasting service allowing participation of a subscriber, ultra-high speed Internet service, a real-time video on demand (VoD) service, and a T-commerce are integrated, not a service providing broadcasting and communication separately. Therefore, the broadcasting/communication-integrated service is expected to develop into an industry that can bring about an enormous market and revenue, and simultaneously, will have great influences on related industries.

Cable digital TV broadcasting, which basically uses an open cable method and a QAM, and ground wave digital TV broadcasting, which uses VSB modulation for a transmission technology, co-exist. In this case, a technology allowing a receiver that receives both cable digital TV broadcasting and the ground wave digital TV broadcasting to explore a channel in a VSB technology and a channel in a QAM technology, is highly required.

SUMMARY OF THE INVENTION

Accordingly, the present invention is directed to a method for setting a digital broadcasting channel that substantially obviates one or more problems due to limitations and disadvantages of the related art.

An object of the present invention is to provide a method for automatically setting, at an apparatus that receives digital broadcasting signals transmitted on the basis of different transmission technologies, digital broadcasting channels of different transmission technologies.

Another object of the present invention is to provide a method for switching, at an apparatus that receives digital broadcasting signals transmitted on the basis of different transmission technologies, to digital broadcasting channels of different transmission technologies.

A further another object of the present invention is to provide a method for automatically setting, at an apparatus that receives ground wave digital TV broadcasting signals and cable digital TV broadcasting signals transmitted on the basis of different transmission technologies, a ground digital TV broadcasting channel and a cable digital TV broadcasting channel.

A still further another object of the present invention to provide a method for automatically switching, at an apparatus that receives ground wave digital TV broadcasting signals and cable digital TV broadcasting signals transmitted on the basis of different transmission technologies, to a ground wave digital TV broadcasting channel and a cable digital TV broadcasting channel.

An even further another object of the present invention is to provide a method for automatically setting, at an apparatus that receives ground wave digital TV broadcasting signals transmitted on the basis of a VSB technology and cable digital TV broadcasting signals transmitted on the basis of a QAM technology, a ground wave digital TV broadcasting channel and a cable digital TV broadcasting channel.

An even yet further another object of the present invention is to provide a method for automatically switching, at an apparatus that receives ground wave digital TV broadcasting signals transmitted on the basis of a VSB technology and cable digital TV broadcasting signals transmitted on the basis of a QAM technology, to a ground wave digital TV broadcasting channel and a cable digital TV broadcasting channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for setting a digital broadcasting channel, the method including: performing channel selection of digital TV broadcasting and judging whether the selected channel is a broadcasting channel; if the selected channel is a broadcasting channel, judging an operation mode during which broadcasting signals are detected according to a predetermined transmission technology; and constructing a map of the selected channel according to the operation mode where the broadcasting signal are detected.

In another aspect of the present invention, there is provided a method for switching to a digital broadcasting channel, the method including: performing channel selection according to a user's channel switching command for digital TV broadcasting; judging an operation mode during which broadcasting signals of the selected channel are detected according to a predetermined transmission technology; and decoding and displaying the selected channel according to the operation mode during which the broadcasting signals are detected.

In a further another aspect of the present invention, there is provided a method for processing a digital broadcasting channel, the method including: selecting, at a receiver that receives a plurality of digital TV broadcasting signals based on different modulation technologies, a digital broadcasting channel; judging a modulation technology of the selected channel; and processing corresponding channel information according to the judged modulation technology.

In a still further another aspect of the present invention, there is provided a method for switching, automatically setting, and processing a channel in a digital broadcasting receiver capable of automatically detecting signals to construct switching to a corresponding channel or setting a channel according to channel scan using a channel map, and storing the map without separate setting according to wired broadcasting by a subscriber or a manufacturing company in a digital TV broadcasting environment where VSB/QAM technologies co-exist.

In a yet still further another aspect of the present invention, there is provided a method for switching, automatically setting, and processing a channel in a digital broadcasting receiver capable of exploring a channel of a digital TV broadcasting based on both VSB and QAM technologies by reducing a time consumed for automatically setting a channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

A method for setting a digital broadcasting channel according to the present invention is applied to an apparatus that receives digital TV broadcasting signals of different transmission technologies in a broadcasting system for transmitting digital broadcasting on the basis of different transmission technologies. For example, the present invention is applied to an apparatus for receiving digital TV broadcasting signals of different modulation technologies.

A method for setting a digital broadcasting channel according to an embodiment of the present invention switches, at a receiver, to digital TV broadcasting channels of different modulation technologies, or automatically sets, at a receiver, a channel on the basis of channel scan (exploration) when ground wave digital TV broadcasting signals and cable TV broadcasting signals are transmitted on the basis of different modulation technologies.

The ground wave digital TV broadcasting technology includes Advanced Television System Committee (ATSC) technology. ATSC technology compresses video signals using MPEG2, compresses audio and voice signals using AC-3, and uses VSB modulation for a transmission technology in order to convey and transmit these compressed signals. The cable digital TV broadcasting technology includes an open cable technology, which modulates signals using quadrature amplitude modulation and transmits the modulated signals.

According to an embodiment of the present invention, when a cable digital TV broadcasting receiver receives ground wave digital TV broadcasting of an ATSC technology that uses VSB modulation, and cable digital TV broadcasting that uses a QAM technology, the present invention switches into a channel suitable for each modulation technology and automatically sets a channel. For example, when ground wave digital TV broadcasting of an ATSC technology that uses VSB modulation on the basis of a cable is retransmitted, and simultaneously, cable digital TV broadcasting of a QAM technology is transmitted, a receiver switches to a channel and automatically sets a channel suitable for each broadcasting.

According to an embodiment of the present invention, VSB and QAM modulation are automatically judged, channel switching or automatic setting for a VSB technology, or channel switching or automatic setting for a QAM technology is performed depending on the judgment result.

Figure 1:
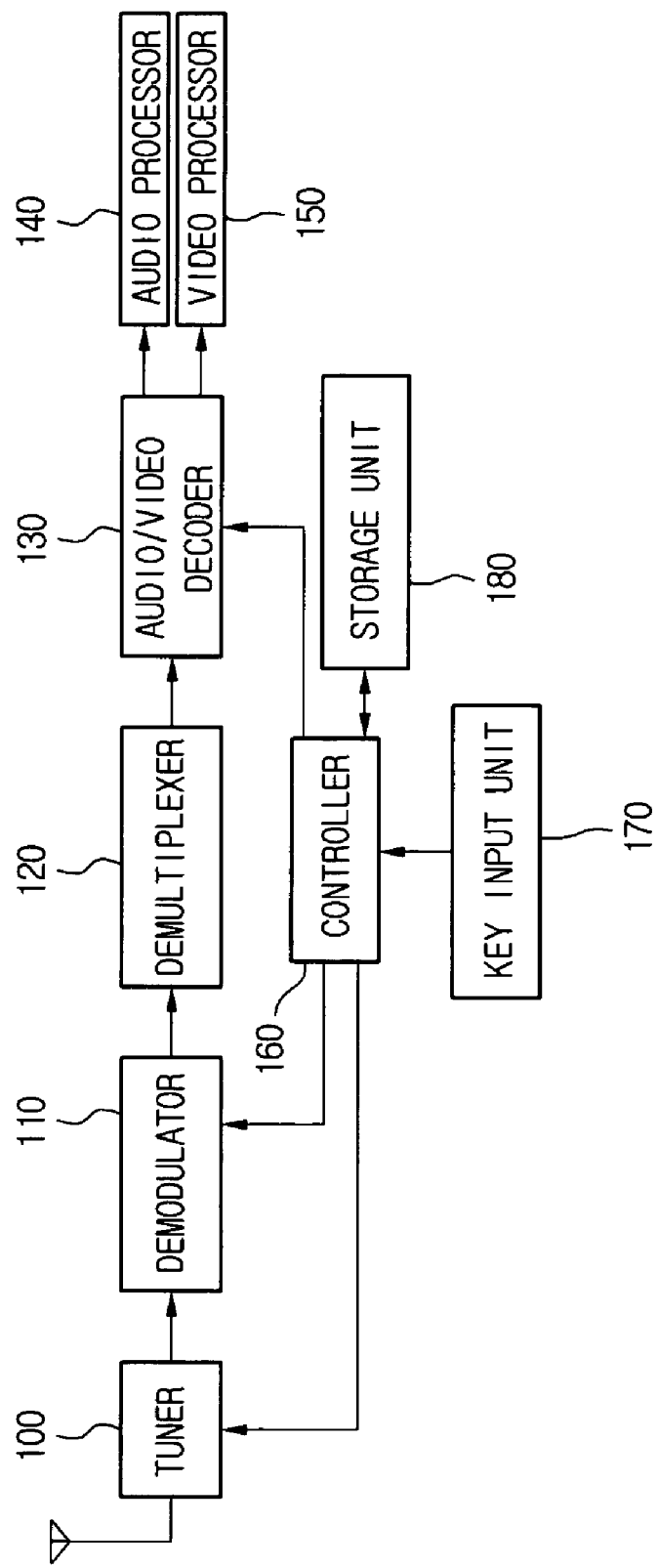
FIG. 1 is a block diagram of a digital broadcasting receiver according to the present invention.

FIG. 1 is a schematic block diagram of a digital broadcasting receiver according to the present invention.

Referring to FIG. 1, the digital broadcasting receiver includes a tuner 100, a demodulator 110, an audio/video decoder 130, an audio processor 140, a video processor 150, a controller 160, a key input unit 170, and a storage unit 180.

The tuner 100 performs one of channel selection and channel switching according to one of a channel switching command and a channel setting command selected by a user, converts broadcasting signals of the selected channel into intermediate frequency (IF) signals, and transmits the converted IF signals to the demodulator 110. In the present embodiment, selecting of a channel for digital TV broadcasting signals is performed using one tuner 100. The tuner 100 delivers a 'No Input Signal Detect Flag (NS flag)' value to the demodulator 110 depending on whether the selected channel contains radio frequency (RF) signals. Whether a selected channel contains broadcasting signals can be judged using the NS flag value. When the NS flag is detected, a corresponding channel is judged not to contain broadcasting signals. When the NS flag is not detected, a corresponding channel is judged to contain broadcasting signal. The demodulator 110 judges whether broadcasting signals are present in a channel using an NF flag of IF signals transmitted from the tuner 100.

The demodulator 110 demodulates broadcasting signals of a channel selected by the tuner 100, corrects errors, and converts the broadcasting signals into stream forms. The demodulator 110 is set to one of a VSB mode, 64 QAM mode, and 256 QAM mode under control of the controller 160. IF signals of a corresponding channel are input from the tuner 100 by this setting of an operation mode, and synchronization signals are sequentially checked for a channel of VSB modulation or QAM modulation.

Here, the operation mode can be set in an order of a VSB mode, a 64 QAM mode, and a 256 QAM mode. The operation mode is not limited thereto but can be performed in various ways. When a synchronization signal is detected during a VSB mode for a selected channel, the channel can be regarded as a ground wave digital TV broadcasting channel. On the other hand, when a synchronization signal is detected during a QAM mode for a selected channel, the channel can be regarded as a cable digital TV broadcasting channel.

The demultiplexer 120 demultiplexes a multiplexed transport stream. By this demultiplexing operation, digital broadcasting signals are separated into video, voice, and addition information signals. The audio/video decoder 130 decodes video and voice signals separated by the demultiplexer 120. The audio processor 140 converts digital audio signals from the audio/video decoder 130 into analog audio signals such that the digital audio signals are output through a speaker. The video processor 150 converts video signals from the audio/video decoder 130 into brightness and color signals such that the converted brightness and color signals are displayed on a screen. The storage unit 180 stores an operating system required for an operation of a digital TV broadcasting receiver, channel setting information, and data/information related to operations of an apparatus. The key input unit 170 inputs a user's command for manipulation of an apparatus.

The controller 160 controls an operation of each part of a digital broadcasting receiver. When one of channel switching and automatic channel setting is requested through the key input unit 170 by a user, the controller 160 controls the tuner 100 to perform channel selection, and broadcasting signals of the selected channel are demodulated by the demodulator 110. Broadcasting signals of the demodulated channel is demultiplexed by the demultiplexer 120, and decoded by the audio/video decoder 130. Decoded audio signals are output to the speaker via the audio processor 140, and decoded video signals are output to a display device via the video processor 150.

When a channel switching command is input through the key input unit 170 by a user, the controller 160 controls the tuner 100 to perform channel selection. The tuner 100 delivers IF signals of the selected channel to the demodulator 110. At this point, the demodulator 110 sequentially switches from a VSB mode to a 64 QAM mode and a 256 QAM mode to explore a modulation technology of the currently selected channel. When a synchronization signal of the currently selected channel is detected during a VSB mode, video signals that correspond to the channel are decoded and displayed. In detail, broadcasting signals of the selected channel are demultiplexed during the VSB mode, audio and video decoding are performed, and displaying of the decoded video signals, and outputting of the decoded audio signals are performed. When a synchronization signal is not detected during the VSB mode, switching to a 64 QAM mode is performed. When a synchronization signal of a currently selected channel is detected during the 64 QAM mode, video signals that correspond to the channel are decoded and displayed. In detail, broadcasting signals of the selected channel are demultiplexed during the 64 QAM mode, audio and video decoding are performed, and displaying of the decoded video signals, and outputting of the decoded audio signals are performed. When a synchronization signal is not detected during the 64 QAM mode, switching to a 256 QAM mode is performed. When a synchronization signal of a currently selected channel is detected during the 256 QAM mode, video signals that correspond to the channel are decoded and displayed. In detail, broadcasting signals of the selected channel are demultiplexed during the 256 QAM mode, audio and video decoding are performed, and displaying of the decoded video signals, and outputting of the decoded audio signals are performed.

As described above, processes of setting an operation mode and detecting a synchronization signal during the set operation mode can be performed in other order different from the above-described order. Also, when a digital broadcasting system uses other QAM technology different from the 64 QAM and 256 QAM technologies, an operation mode is set to a corresponding QAM technology, so that channel switching by automatic detection of a modulation technology can be performed. That is, the present invention is not limited to the above-described modulation technologies.

When a channel automatic setting command is input through the key input unit 170 by a user, the controller 100 controls the tuner 100 to perform channel selection. The tuner 100 delivers IF signals of the selected channel to the demodulator 110, and delivers a signal for detecting whether RF signals are contained in the selected channel, that is, an NS flag value to the demodulator 110.

It is possible to judge whether broadcasting signals are present in the currently selected channel using the NS flag. When broadcasting signals are not present in the currently selected channel, the controller 160 controls the tuner 100 to skip the channel and select a next channel. This process is repeatedly performed until a channel containing broadcasting signals is selected using an NS flag.

When broadcasting signals are present in a currently selected channel in view of an NS flag, the demodulator 110 sequentially switches from a VSB mode to a 64 QAM mode and a 256 QAM mode to explore a modulation technology of the currently selected channel. When a synchronization signal of the currently selected channel is detected during a VSB mode, the currently selected channel is a ground wave digital TV broadcasting channel. A channel map of a corresponding broadcasting technology, that is, a channel map according to automatic channel setting is constructed and stored using this channel information. Channel scan and automatic setting of a digital TV broadcasting of a VSB technology are performed in this manner.

When a synchronization signal is not detected during the VSB mode, switching to a 64 QAM mode is performed. When a synchronization signal of the currently selected channel is detected during the 64 QAM mode, the currently selected channel is a cable digital TV broadcasting channel of a 64 QAM technology. A channel map of a corresponding broadcasting technology, that is, a channel map according to automatic channel setting is constructed and stored using this channel information. Channel scan and automatic setting of a cable digital TV broadcasting of a 64 QAM technology are performed in this manner.

When a synchronization signal is not detected during the 64 QAM mode, switching to a 256 QAM mode is performed. When a synchronization signal of the currently selected channel is detected during the 256 QAM mode, the currently selected channel is a cable digital TV broadcasting channel of a 256 QAM technology. A channel map of a corresponding broadcasting technology, that is, a channel map according to automatic channel setting is constructed and stored using this channel information. Channel scan and automatic setting of a cable digital TV broadcasting of a 256 QAM technology are performed in this manner.

As described above, processes of setting an operation mode and detecting a synchronization signal during the set operation mode in an automatic channel setting process can be performed in other order different from the above-described order. Also, when a digital broadcasting system uses other QAM technology different from the 64 QAM and 256 QAM technologies, an operation mode is set to a corresponding QAM technology, so that channel automatic setting by automatic detection of a modulation technology can be performed. That is, the present invention is not limited to the above-described modulation technologies.

Figure 2:
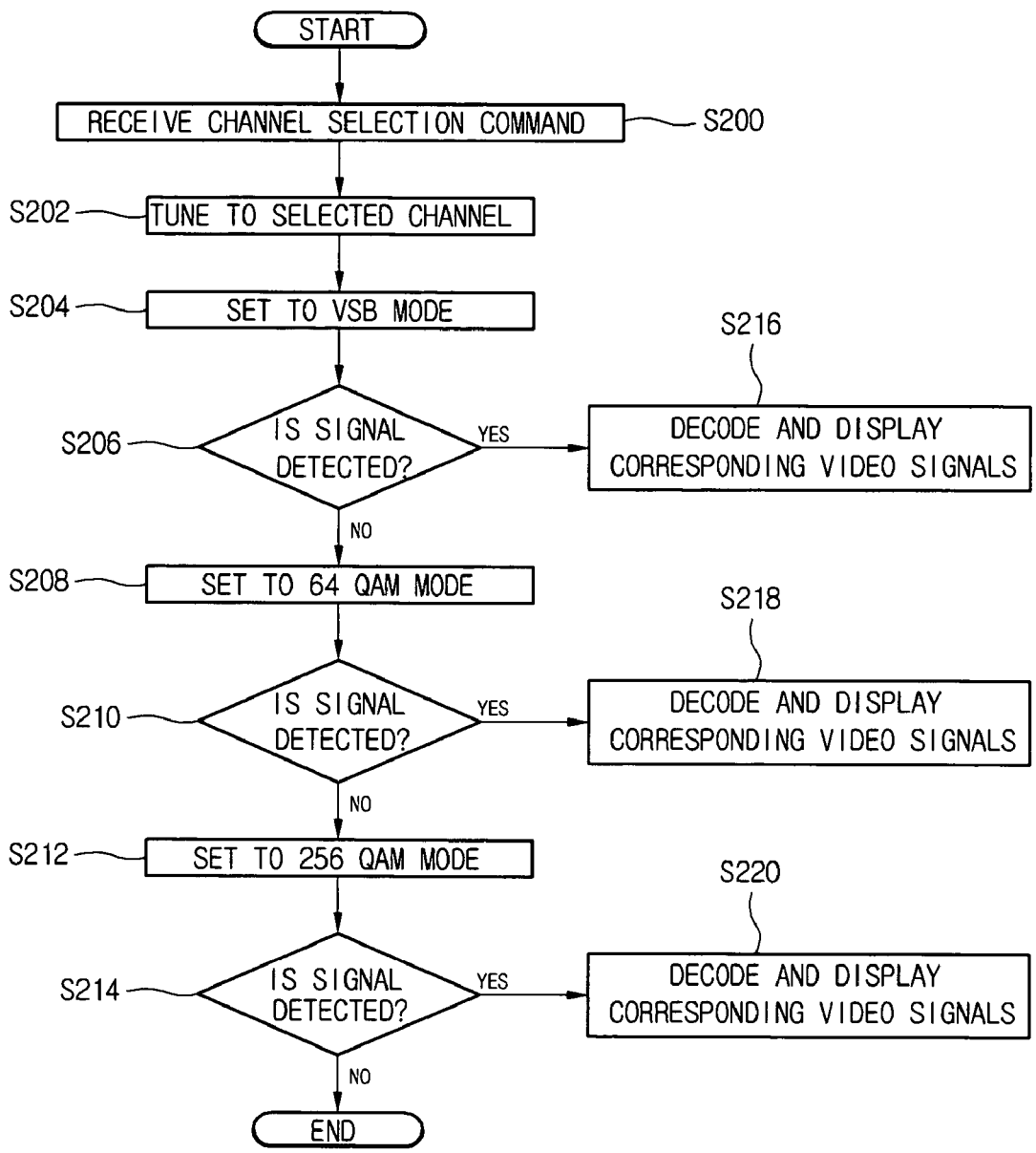
FIG. 2 is a flowchart of a method for performing channel tuning in a digital broadcasting receiver according to the present invention.

FIG. 2 is a flowchart of a method for performing channel tuning in a digital broadcasting receiver according to the present invention.

A first step S200 is a step of inputting a channel selection command. During the step S200, a subscriber inputs a channel switching command for selecting a desired channel using an interface device such as the key input unit and a remote controller. The channel switching command is delivered to the controller. The controller performs channel switching by detection of a modulation technology according to the channel switching command in an order which will be described later.

A second step S202 is a step of selecting a desired channel. The controller controls the tuner to select a channel. A third step S204 is a step of setting an operation mode to a VSB mode.

A fourth step s206 is a step of judging whether a synchronization signal is detected during a VSB mode. That is, a digital broadcasting receiver according to the present invention sets an operation mode to a VSB mode in order to detect a modulation technology of a selected channel, judges whether a synchronization signal is detected during the VSB mode, and judges a transmission technology of the selected channel using the detected synchronization signal.

A fifth step S216 is a step of decoding and outputting broadcasting signals of a channel when a synchronization signal of the channel is detected during the VSB mode. Here, only video signals are described. That is, when a synchronization signal is detected during the VSB mode, a digital broadcasting receiver performs demodulation during the VSB mode and decodes and displays corresponding video signals. By doing so, switching to a channel of a corresponding technology is performed.

A sixth step S208 is a step of setting an operation mode of a digital broadcasting receiver to a 64 QAM mode when a synchronization signal of a currently selected channel is not detected during the VSB mode. A seventh step S210 is a step of judging whether a synchronization signal is detected during a 64 QAM mode. That is, a digital broadcasting receiver according to the present invention sets an operation mode to a 64 QAM mode in order to detect a modulation technology of a selected channel, judges whether a synchronization signal is detected during the 64 QAM mode, and judges a transmission technology of the selected channel using the detected synchronization signal.

An eighth step S218 is a step of decoding and outputting broadcasting signals of a channel when a synchronization signal of the channel is detected during the 64 QAM mode. Here, only video signals are described. That is, when a synchronization signal is detected during the 64 QAM mode, a digital broadcasting receiver performs demodulation during the 64 QAM mode and decodes and displays corresponding video signals. By doing so, switching to a channel of a corresponding technology is performed.

A ninth step S212 is a step of setting an operation mode of a digital broadcasting receiver to a 256 QAM mode when a synchronization signal of a currently selected channel is not detected during the 64 QAM mode. A tenth step S214 is a step of judging whether a synchronization signal is detected during the 256 QAM mode. That is, a digital broadcasting receiver according to the present invention sets an operation mode to the 256 QAM mode in order to detect a modulation technology of a selected channel, judges whether a synchronization signal is detected during the 256 QAM mode, and judges a transmission technology of the selected channel using the detected synchronization signal.

An eleventh step S220 is a step of decoding and outputting broadcasting signals of a channel when a synchronization signal of the channel is detected during the 256 QAM mode. Here, only video signals are described. That is, when a synchronization signal is detected during the 256 QAM mode, a digital broadcasting receiver performs demodulation during the 256 QAM mode and decodes and displays corresponding video signals. By doing so, switching to a channel of a corresponding technology is performed.

As described above, an order in which a modulation technology is judged may change and a kind of a modulation technology may change also in an embodiment of FIG. 2.

When a channel switching command is input by a subscriber, a digital broadcasting receiver calculates a frequency value associated with a channel in a software manner, receives IF signals of a corresponding channel from the tuner, and sequentially check whether synchronization signals of VSB and QAM technologies are detected to switch to a corresponding channel and output audio/video signals of broadcasting signals.

Figure 3:
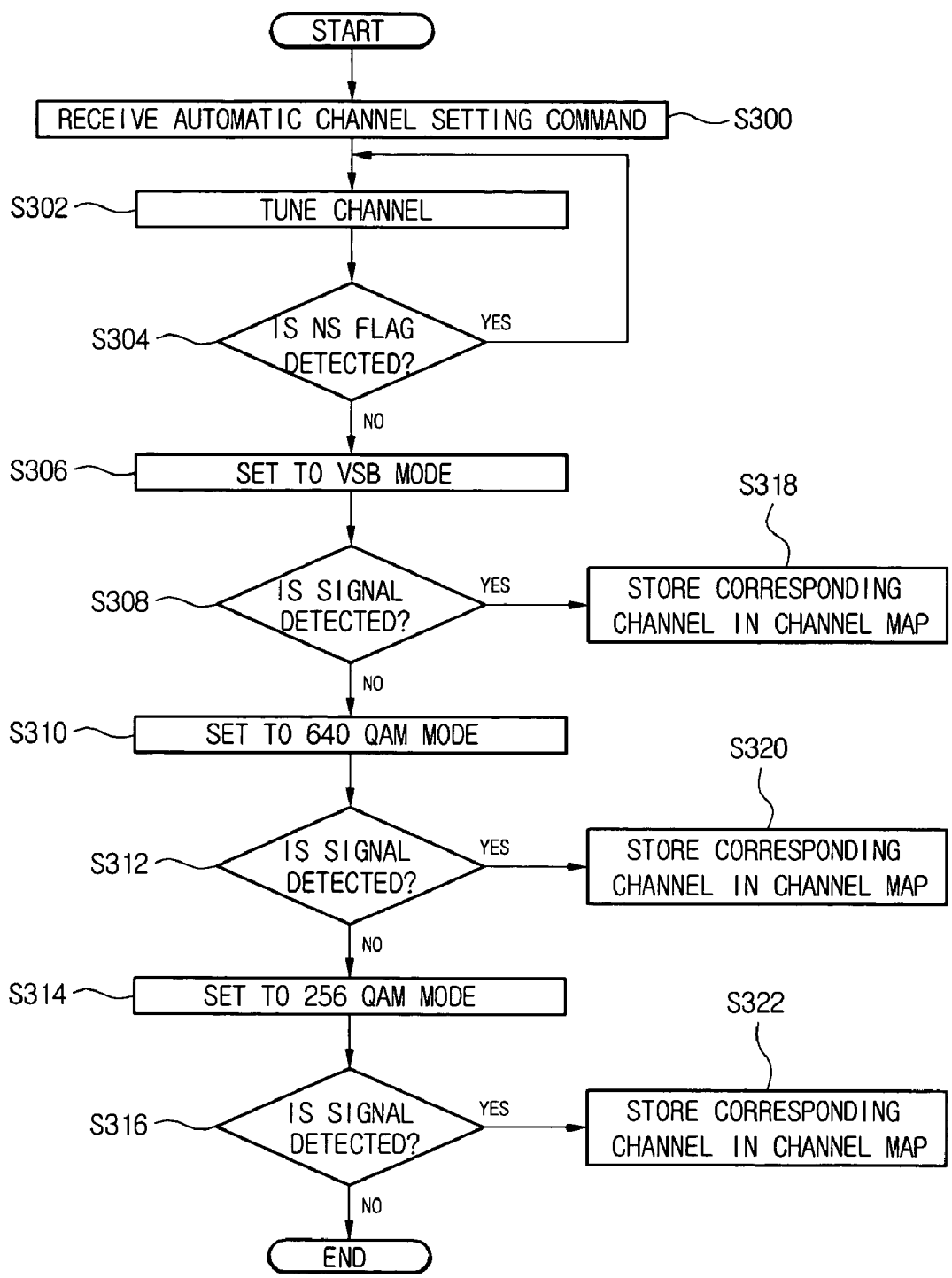
FIG. 3 is a flowchart of a method for automatically setting a channel in a digital broadcasting receiver according to the present invention.

FIG. 3 is a flowchart of a method for automatically setting a channel in a digital broadcasting receiver according to the present invention.

A first step S300 is a step of inputting an automatic channel setting command.

During the step S300, a subscriber inputs an automatic channel setting command for setting a channel using an interface device such as the key input unit and a remote controller. The automatic channel setting command is delivered to the controller. The controller performs automatic channel switching by detection of a modulation technology according to the automatic channel setting command in an order which will be described later.

A second step S302 is a step of performing channel selection. The controller controls the tuner to select a channel. A third step S304 is a step of judging whether an NS flag is detected. Whether signals are present in a channel is judged using a no input signal detect flag (NS flag) of a corresponding channel. When the NS flag of the selected channel is not detected, it is judged that signals are present in a corresponding channel. When the NS flag of the selected channel is detected, it is judged that signals are not present in the corresponding channel.

When signals are not present in the corresponding channel as a result of the judgment in the third step S304, the corresponding channel is skipped and a next channel is selected. Such operations are performed until NS flag is detected, and a channel where signals are present is explored.

A fourth step S306 is a step of setting an operation mode of a digital broadcasting receiver to a VSB mode. Fifth step S308 is a step of judging whether a synchronization signal is detected during a VSB mode. That is, a digital broadcasting receiver according to the present invention sets an operation mode to a VSB mode in order to detect a modulation technology of a selected channel, judges whether a synchronization signal is detected during the VSB mode, and judges a transmission technology of the selected channel using the detected synchronization signal.

A sixth step S318 is a step of storing a channel in a form of a channel map of a VSB technology when a synchronization signal is detected during a VSB mode. When a synchronization signal of the currently selected channel is detected during the VSB mode, the currently selected channel is a ground digital TV broadcasting channel. A channel map of a corresponding broadcasting technology, that is, a channel map according to automatic channel setting is constructed and stored using this channel information. Channel scan and automatic setting of a digital TV broadcasting of a VSB technology are performed in this manner.

A seventh step S310 is a step of setting an operation mode of a digital broadcasting receiver to a 64 QAM mode when a synchronization signal of a currently selected channel is not detected during the VSB mode. An eighth step S312 is a step of judging whether a synchronization signal is detected during the 64 QAM mode. That is, a digital broadcasting receiver according to the present invention sets an operation mode to the 64 QAM mode in order to detect a modulation technology of a selected channel, judges whether a synchronization signal is detected during the 64 QAM mode, and judges a transmission technology of the selected channel using the detected synchronization signal.

A ninth step S320 is a step of storing a channel in a form of a channel map of a 64 QAM technology when a synchronization signal is detected during the 64 QAM mode.

When a synchronization signal of the currently selected channel is detected during the 64 QAM mode, the currently selected channel is a cable digital TV broadcasting channel of a 64 QAM technology. A channel map of a corresponding broadcasting technology, that is, a channel map according to automatic channel setting is constructed and stored using this channel information. Channel scan and automatic setting of a digital TV broadcasting of a 64 QAM technology are performed in this manner.

A tenth step S314 is a step of setting an operation mode of a digital broadcasting receiver to a 256 QAM mode when a synchronization signal of a currently selected channel is not detected during the 64 QAM mode. An eleventh step S316 is a step of judging whether a synchronization signal is detected during the 256 QAM mode. That is, a digital broadcasting receiver according to the present invention sets an operation mode to the 256 QAM mode in order to detect a modulation technology of a selected channel, judges whether a synchronization signal is detected during the 256 QAM mode, and judges a transmission technology of the selected channel using the detected synchronization signal.

A twelfth step S322 is a step of storing a channel in a form of a channel map of a 256 QAM technology when a synchronization signal is detected during the 256 QAM mode.

When a synchronization signal of the currently selected channel is detected during the 256 QAM mode, the currently selected channel is a cable digital TV broadcasting channel of a 256 QAM technology. A channel map of a corresponding broadcasting technology, that is, a channel map according to automatic channel setting is constructed and stored using this channel information. Channel scan and automatic setting of a digital TV broadcasting of a 256 QAM technology are performed in this manner.

As described above, an order in which a modulation technology is judged may change and a kind of a modulation technology may change also in an embodiment of FIG. 3.

According to the embodiment of the present invention described with reference to FIG. 3, the present invention does not judge whether a synchronization signal is detected for all channels. In the embodiment of the present invention, whether RF signals are received is checked using an NS flag. A synchronization signal of VSB or QAM technology is checked only if the RF signals are received. Since judging of a modulation technology of a selected channel and channel setting are performed only if a synchronization signal of the selected channel is detected, a time required for exploring a channel for automatic channel setting can reduce.

Figure 4:
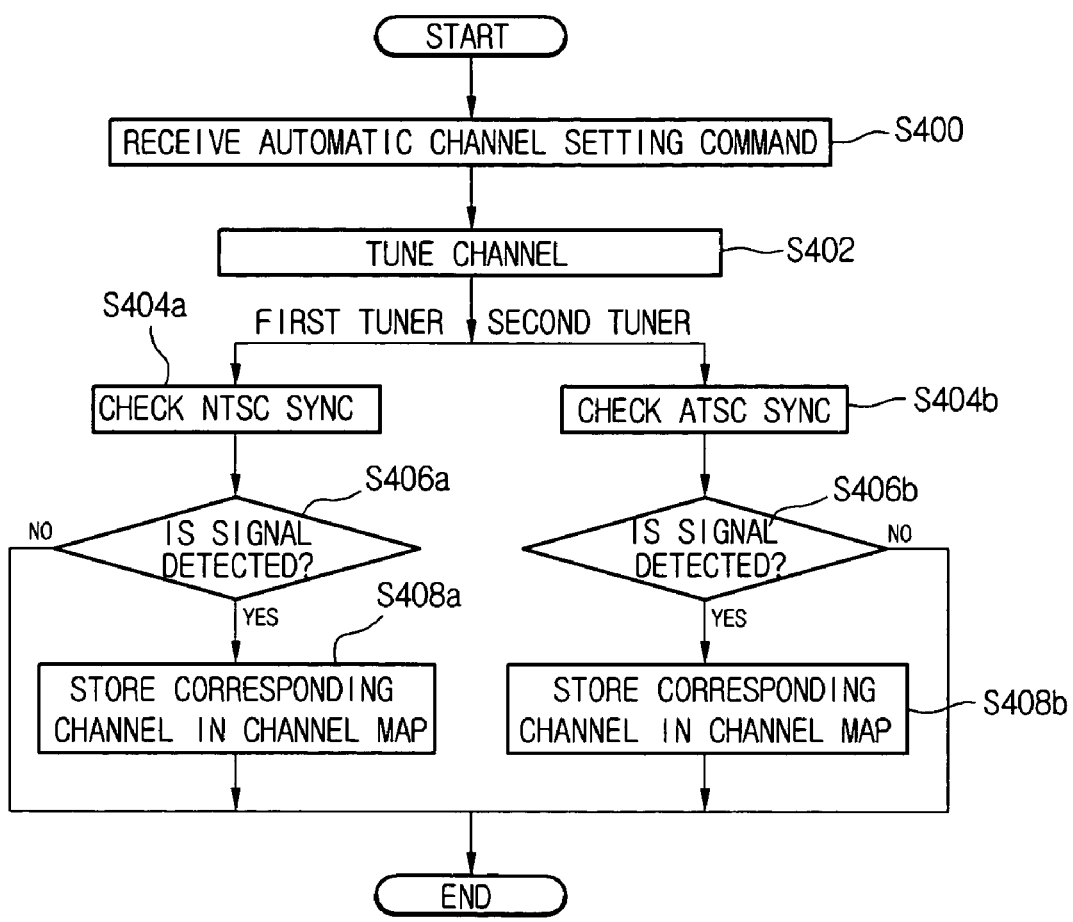
FIG. 4 is a flowchart of a method for automatically setting a channel in a digital broadcasting receiver having two tuners according to the present invention.

FIG. 4 is a flowchart of a method for automatically setting a channel in a digital broadcasting receiver having two tuners according to the present invention. An automatic channel setting command is input by a subscriber (S400). A first tuner and a second tuner perform channel selection according to the automatic channel setting command (S402). The first and second tuners simultaneously perform channel scan.

Channel scan operations by the first and second tuners are performed simultaneously, with the first tuner exploring a National Television Standards Committee (NTSC) synchronization signal, and the second tuner exploring an Advanced Television Systems Committee (ATSC) synchronization signal.

When channel selection is performed during the channel selection (S402), a digital broadcasting receiver sets the first tuner to an NTSC mode, and judges whether a synchronization signal of the NTSC mode is detected (S404a, S406a). When the synchronization signal of the NTSC mode is detected, the digital broadcasting receiver judges signals are present in a corresponding channel, and stores the corresponding channel in a channel map (S408a).

A channel setting process by the first tuner during the NTSC mode will be described below in detail. When channel selection is performed, the digital broadcasting receiver sets the first tuner to a 64 QAM mode, and judges whether signals are detected during the 64 QAM mode. When the signals are detected during the 64 QAM mode as a result of the judgment, the digital broadcasting receiver stores a corresponding channel in a channel map, and transmits information that instructs to skip channel scan of the corresponding channel, for example, a predetermined message (a channel scan skip message) to the second tuner. The second tuner that has received the channel scan skip message skips channel selection without performing the channel selection. Accordingly, the channel scan by the second tuner can be performed more swiftly.

When signals are detected during a 64 QAM mode, the digital broadcasting receiver sets an operation mode to a 256 QAM mode, and judges whether signals are detected during the 256 QAM. When the signals are detected during the 256 QAM mode as a result of the judgment, the digital broadcasting receiver stores a corresponding channel in a channel map, and transmits information that instructs to skip channel scan of the corresponding channel, for example, a predetermined message (a channel scan skip message) to the second tuner. The second tuner that has received the channel scan skip message skips channel selection without performing the channel selection. Accordingly, the channel scan by the second tuner can be performed more swiftly.

Next, a method for scanning and setting a channel at the second tuner will be described.

When channel selection is performed during the channel selection (S402), a digital broadcasting receiver sets the second tuner to an ATSC mode, and judges whether a synchronization signal of the ATSC mode is detected (S404b, S406b). When the synchronization signal of the ATSC mode is detected, the digital broadcasting receiver judges signals are present in a corresponding channel, and stores the corresponding channel in a channel map (S408b).

A channel setting process by the second tuner during the NTSC mode will be described below in detail. When channel selection is performed, the digital broadcasting receiver sets the second tuner to a VSB mode, and judges whether signals are detected during the VSB mode. When the signals are detected during the VSB mode as a result of the judgment, the digital broadcasting receiver stores a corresponding channel in a channel map, and transmits information that instructs to skip channel scan of the corresponding channel, for example, a predetermined message (a channel scan skip message) to the first tuner. The first tuner that has received the channel scan skip message skips channel selection without performing the channel selection. Accordingly, the channel scan by the second tuner can be performed more swiftly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for setting a digital broadcasting channel, the method comprising:
   performing channel selection of digital TV broadcasting and judging whether the selected channel is a broadcasting channel;
   if the selected channel is a broadcasting channel, judging an operation mode during which broadcasting signals are detected according to a predetermined transmission technology; and
   constructing a map of the selected channel according to the operation mode where the broadcasting signal are detected.

2. The method according to claim 1, wherein the judging of whether the selected channel is the broadcasting channel comprises judging whether the selected channel is the broadcasting channel depending on whether RF (radio frequency) signals are received through the selected channel.

3. The method according to claim 1, wherein the judging of whether the selected channel is the broadcasting channel comprises judging whether the selected channel is the broadcasting channel using an NS flag (no input signal detect flag) from a demodulator during the channel selection.

4. The method according to claim 1, wherein the judging of whether the operation mode comprises judging an operation mode during which broadcasting signals are detected according to the predetermined transmission technology depending on whether a synchronization signal of the selected broadcasting channel is detected.

5. The method according to claim 1, wherein the operation mode during which broadcasting signals are detected according to the predetermined transmission technology is one of channel setting of a ground wave digital TV broadcasting, and channel setting of a cable digital TV broadcasting.

6. The method according to claim 1, wherein the transmission technology considered during the channel selection is one of a VSB (vestigial side band) technology, and a QAM (quadrature amplitude modulation) technology.

* * * * *